US008892943B2

(12) United States Patent  
Ingimundarson

(10) Patent No.: US 8,892,943 B2  
(45) Date of Patent: Nov. 18, 2014

(54) ELECTRONIC DEVICE AND METHOD FOR VERIFYING CORRECT PROGRAM EXECUTION

(75) Inventor: Arni Ingimundarson, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 407 days.

(21) Appl. No.: 12/852,229

(22) Filed: Aug. 6, 2010

(65) Prior Publication Data

US 2011/0041013 A1 Feb. 17, 2011

(30) Foreign Application Priority Data

Aug. 14, 2009 (DE) .......................... 10 2009 037 630

(51) Int. Cl.
  *G06F 11/00* (2006.01)
  *G06F 11/10* (2006.01)
(52) U.S. Cl.
  CPC .................................. *G06F 11/1048* (2013.01)
  USPC ............................................. 714/10; 714/45
(58) Field of Classification Search
  USPC ......................................................... 714/10
  See application file for complete search history.

(56) References Cited

U.S. PATENT DOCUMENTS

| 7,664,937 | B2 * | 2/2010 | Jacob et al. | .................... 712/214 |
| 8,261,130 | B2 * | 9/2012 | Mayer et al. | ..................... 714/45 |
| 2003/0182653 | A1 * | 9/2003 | Desoli et al. | ................... 717/138 |
| 2005/0283650 | A1 * | 12/2005 | Zhang et al. | ...................... 714/6 |
| 2008/0215860 | A1 * | 9/2008 | Jacob et al. | .................... 712/226 |
| 2008/0215920 | A1 * | 9/2008 | Mayer et al. | ..................... 714/38 |

FOREIGN PATENT DOCUMENTS

| DE | 10131577 | 1/2003 |
| DE | 10340411 | 10/2005 |

OTHER PUBLICATIONS

"Accelerating Algorithms in Hardware," D&R Industry Articles at Embeded.com, Jan. 20, 2004, pp. 1-5, by Lara Simsic.

* cited by examiner

*Primary Examiner* — Kamini Patel  
(74) *Attorney, Agent, or Firm* — William B. Kempler; Frederick J. Telecky, Jr.

(57) ABSTRACT

An electronic device is provided which comprises a microprocessor for executing a program code and a first hardware code path verifying (CPV) stage coupled to the microprocessor. The hardware CPV stage comprises a first error detection code (EDC) generator configured to continuously determine an error detection code on a continuous sequence of code relating to an actually executed portion of the program code and to compare the actual error detection code with a predetermined error code so as to verify correct execution of the program code and to indicate an error.

19 Claims, 3 Drawing Sheets

ELECTRONIC DEVICE AND METHOD FOR VERIFYING CORRECT PROGRAM EXECUTION

CROSS-REFERENCE TO RELATED APPLICATIONS

This patent application claims priority from German Patent Application No. 10 2009 037 630.5, filed Aug. 14, 2009, which is incorporated herein by reference in its entirety.

FIELD OF THE INVENTION

The present invention relates to an electronic device including a microprocessor for executing a program code configured to verify correct execution of the program code and a corresponding method.

BACKGROUND OF THE INVENTION

Microprocessor based systems or embedded microcontroller systems, as for example passive or active entry systems, RFID systems, smart and security cards require safe and reliable program execution. Harsh or extreme operating conditions as well as malicious fault attacks can cause malfunctioning and unsafe operation, which is to be avoided under all circumstances.

In order to detect errors and deviations from normal program execution, it is known in the art to insert some checkpoints into the program code. At these checkpoints a value in a memory location is compared with an expected value. If the values match, normal program execution is continued. If the value in the memory is not equal to the expected value, program execution is aborted.

However, this conventional solution has several drawbacks. The granularity of the checkpoints along the program code depends on the number of checkpoints and must be kept low in order to minimize execution time. This means that program execution is not verified in between the checkpoints and throughout a considerable part of the program. Furthermore, the general reliability and verifiability is limited as the known methods are based on self-verification of the program.

SUMMARY OF THE INVENTION

A general object of the present invention to provide an electronic device and a method for verifying correct program execution which are safer than those in the prior art.

In one aspect of the invention, an electronic device is provided which comprises a microprocessor for executing a program code. There is further a first hardware code path verifying (CPV) stage coupled to the microprocessor. The first hardware CPV stage comprises a first error detection code (EDC) generator. The first EDC generator is configured to continuously determine an error detection code on a continuous sequence of code relating to an actually executed portion of the program code. The first hardware CPV stage is configured to compare the actual error detection code with a predetermined error code so as to verify correct execution of the program code. Based on the comparison result the CPV stage can indicate an error or abnormal program code execution. In this aspect of the invention, the CPV stage can be implemented in hardware and independently and separately from the microprocessor. Furthermore, the CPV stage includes an EDC generator, which may for example be a stage for performing a cyclic redundancy check (CRC). The EDC generator can receive code that relates to the program which is actually executed. The program code or related data is fed as a continuous sequence of data to the EDC generator, which continuously calculates error detection code values on the received data. "Continuous" means that the data or code is forwarded to the CPV stage and/or EDC generator and processed in the EDC generator when it occurs during program execution and not only at certain breakpoints. Forwarding and processing of data and/or code to the EDC generator or CPV stage may be performed based on a clock signal and in accordance with the steps of executing the program. However, the comparison of the determined error detection code values may only be performed at some breakpoints of the program. This means that the CPV stage provides highest granularity and therefore highest safety standards. Furthermore, the CPV stage does not consume additional data processing time from the microprocessor.

There are several possible implementations for an EDC generator. Typically, the error detection codes which are output by the EDC generator transmit more bits than originally contained in the received code. The predetermined error detection code may then contain a fixed number of original code bits (herein also referred to as data bits), followed by a fixed number of check bits (usually referred to as redundancy in the literature). The check bits can be derived from the data bits by a deterministic algorithm. The original code may previously be run through the same algorithm and the result may be stored as the predetermined expected error detection code. The EDC generator applies the same algorithm to the received code bits and the CPV stage compares its output with the predetermined error detection code. If the values do not match, an error has occurred at some point during the program execution. In another embodiment a non-systematic EDC generator may be used, such as some raptor codes. The code bits may then be transformed into at least as many error detection code bits, and the stored predetermined error detection code may only contain these error detection code bits.

The EDC generator may be implemented in accordance with a scheme using parity bits. However, a parity bit is an error detection mechanism that can only detect an odd number of errors. The continuous stream of code received or derived from the microprocessor during program execution may then be broken up into blocks of bits, and the amount of '1' bits is determined. A parity bit is set (or cleared) if the number of one bits is odd (or even).

The EDC generator may also be implemented in accordance with a scheme that uses a checksum. The EDC generator may then determine an arithmetic sum of code words of a certain word length, for example byte values, and their carry value. The sum may then be negated, and stored as the predetermined error detection code. The CPV stage may then be configured to calculate a new checksum on the received code during program execution which is extended with the checksum. If the new checksum is not 0, an error is detected. The EDC generator for the checksum schemes may include parity bits, check digits, and longitudinal redundancy check.

The EDC generator may also be implemented in accordance with a cyclic redundancy check. In a cyclic redundancy check, a block of data is considered as the coefficients to a polynomial which is then divided by a fixed, predetermined polynomial. The coefficients of the result of the division are taken as the redundant data bits, the cyclic redundancy code (CRC). The CRC may then be stored. During program execution, the CPV stage (or rather the EDC generator in the CPV stage) may re-compute the CRC from the received code bits (these code bits from the microprocessor may also be referred to as the payload) and compare the stored CRC with the new CRC. A mismatch indicates that an error occurred.

Other embodiments may use a Hamming distance based check. For Hamming distance checks, an EDC generator may be implemented so as to map every n bit word of the code into a bigger n+d+1 bit word so that the minimum Hamming distance between each valid mapping is d+1. Still other embodiments may use hash functions, horizontal and vertical redundancy check, other types of redundancy check including horizontal redundancy check, vertical redundancy check and double, dual or diagonal parity (used in RAID-DP).

According to an aspect of the invention, the continuous sequence of code is not limited to program code but may alternatively use or also include data, address code and/or deterministic state information.

In another embodiment, the first hardware CPV stage may be coupled to a data bus and/or an address bus and/or a command bus and/or internal state value bus. (i.e., for example an internal FSM of a CPU) of the microprocessor for monitoring the continuous sequence of code. The CPV stage may then be independently coupled to existing bus structures and retrieves the data from there in order to determine the error detection code. The CPV stage may then monitor data, addresses and/or commands propagating through the busses while the microprocessor executes the program.

The first hardware CPV stage may be configured to compare the actual error detection code with the predetermined error code at a predetermined check point of the program flow. The CPV stage may then include a control stage. The control stage may be configured to receive control and/or configuration signals from the microprocessor. The control stage may then issue enable signals for performing a comparison of a predetermined error code and an actual error code in response to a control and/or configuration signal from the CPU. The CPV stage may include one or more comparators for performing the comparisons of the predetermined error code and the actual error code.

In an aspect of the invention, a CPV stage may also comprise more than one EDC generator. In an embodiment, the first hardware CPV stage may comprise a second EDC generator. The first and the second EDC generator can then be configured to be independently enabled or disabled for determining error detection codes of different paths of the program code. The multiple EDC generators may then be coupled to receive code relating to different execution paths of the executed program. This aspect relates to the fact that most programs do not have any fixed or even predictable program flow. It is therefore necessary to take account of all possible variations during program execution. This can be realized with multiple EDC generators.

In still another aspect of the invention, there may also be more than one CPV stage. In an embodiment, there may be a second hardware CPV stage and the first hardware CPV stage and the second hardware CPV stage may be configured to be independently enabled or disabled. Similar to using several EDC generators within one CPV it can be useful to use various CPV stages and/or EDC generators. The CPV stages and/or EDC generators may then be configured to be enabled or disabled when the program enters or leaves loops within the program flow. This can be a very efficient way of verifying code independent of the number of loops or the number of times a program goes through a loop. In an embodiment, the electronic device may be configured to use two hardware CPV stages or two EDC generators in order to handle the loops of a program. A first hardware CPV stage or EDC generator may then be enabled when the loop is entered and a second CPV stage or EDC generator may be disabled. When the loop is left, the second CPV stage or EDC generator may be enabled and the first hardware CPV stage or EDC generator may then be disabled. Two or more CPV stages may be used if two or more busses or other hardware structures or components are to be monitored independently.

In an embodiment, the electronic device may be configured to enable or disable the EDC generators and/or hardware CPV stages based on address information. The embodiments of the invention are capable of using address information enabling and disabling EDC generators or CPV stages. Furthermore, address information can be included in the data processed in the EDC of one or more CPVs which is impossible with prior art software implementations.

The invention also provides a method of verifying correct program execution of a microprocessor with a first hardware code path verifying (CPV) stage coupled to the microprocessor. A program code is run on the microprocessor. The respective data words relating to op-codes and/or data and/or status information are continuously passed to the CPV stage. The hardware CPV stage continuously determines an error detection code on a continuous sequence of code relating to a portion of the program code while the program code is being executed. The CPV stage also compares the actual error detection code with a predetermined error code so as to verify correct execution of the program code and to indicate an error.

BRIEF DESCRIPTION OF THE DRAWINGS

Further aspects of the invention will ensue from the description herein below of preferred embodiments of the invention with reference to the accompanying drawings, wherein.

DESCRIPTION OF THE EMBODIMENTS

Figure 1:
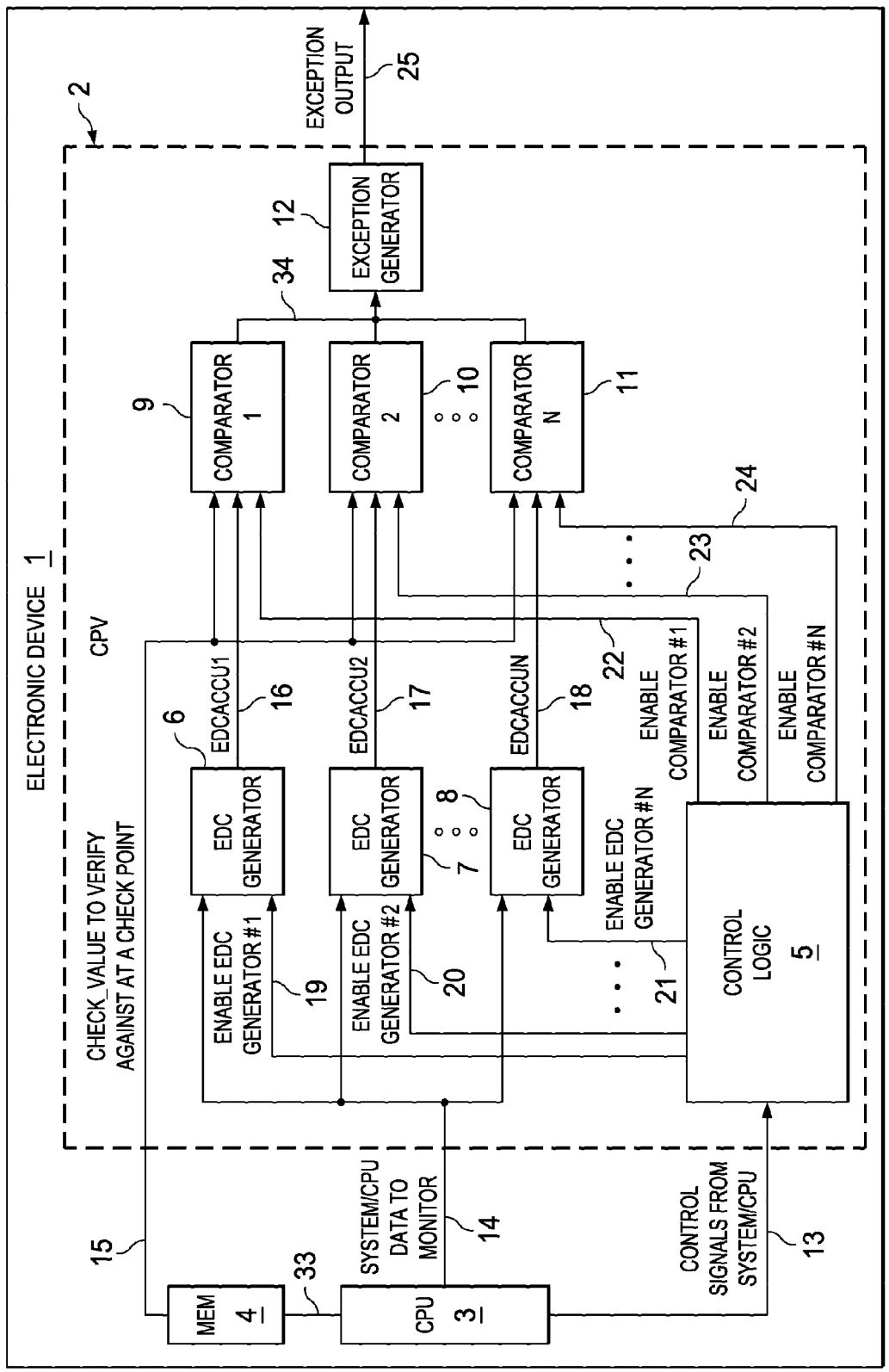
FIG. 1 shows a simplified block diagram of an electronic device in accordance with aspects of the invention.

FIG. 1 shows a simplified block diagram of an electronic device 1 according to aspects of the invention. The electronic device 1 may be a microprocessor or microcontroller embedded system. The electronic device 1 may completely be integrated as an integrated semiconductor device or some components, as for example the microprocessor (or microcontroller) CPU 3, the memory 4 and the CPV stage 2 may be integrated on a single or multiple semiconductor dice. According to aspects of the invention, the microprocessor CPU 3 is supplemented by a CPV stage 2. The CPV stage 2 may be connected to a microprocessor input/output (I/O) port (as shown) but it may also be arranged inside the microprocessor 3. The CPV stage can be configured to monitor any code or data relating to program execution, as for example the program code, any address data, and internal, deterministic CPU state data or any other data the CPU is processing. There may be two or more EDC generators inside a CPV stage which build accumulative EDC values over the code (i.e. generally data). The microcontroller 3 may have an interface allowing the microcontroller to enable, disable and reset each CPV module and verify the accumulative EDC value of an enabled CPV.

In this embodiment, the CPV stage 2 includes N EDC generators, which are configured to determine an error detection code over system data received from the microprocessor CPU 3 through line 14. The code may be forwarded in accordance with a system clock signal. It may be forwarded through line 14 in accordance with a program counter indicating that a next command in the program is executed. The code or data may be passed to an EDC generator through line 14, at each change of code or data due to program execution (new data, address, command or status information as, for example binary words (e.g. 8, 16, 32, 64 or more bits)). The transfer of code or data through line 14 may then for example be triggered by the fact that a new command (opcode) of a program is executed or data, address, status information and/or any other data or information is passed through an external or internal bus coupled to microcontroller.

There are many possible implementations for the EDC generators 6, 7, 8. Typically, the error detection codes EDCACCU1 to EDCACCUN which are output by the EDC generator include more bits than originally contained in the code which is sequentially received over time. The check value (predetermined error detection code) received through line 15 may then include a fixed number of original code bits (herein also referred to as data bits), followed by a fixed number of check bits (usually referred to as redundancy in the literature). The check bits can be derived from the data bits by a deterministic algorithm. This algorithm can then be implemented in the EDC generators 6, 7, 8. The original code may previously (before program execution) be run through the same algorithm and the result may be stored as the predetermined expected error detection code. The EDC generator 6, 7, 8 applies the same algorithm to the received code bits (through line 14) and the CPV stage compares its output in comparators 9, 10, 11 with the predetermined error detection code. If the values do not match, an error has occurred at some point during the program execution. In an embodiment the EDC generators 6, 7, 8 may all apply the same error detection code method. The EDC generators 6, 7, 8 may then be configured to calculate an accumulative code on the received sequence of code. In one embodiment a non-systematic EDC generator may be used, such as some raptor codes. The code bits received through line 14 may then be transformed into at least as many error detection code bits, and the stored predetermined error detection (in memory MEM 4) code may only contain these error detection code bits. The predetermined check codes do not necessarily need to be stored in a memory but can be stored with the program code and transmitted via the same lines as the data to monitor (for example line 14). In another embodiment, the EDC generators 6, 7, 8 may also be implemented in accordance with a scheme that uses parity bits. This is useful if only an odd number of errors should be detected. With the parity bit error detection, the continuous stream of code received or derived from the microprocessor 3 during program execution may then be broken up into blocks of bits, and the number of 1 bits is counted. A parity bit is set (or cleared) if the number of one bits is odd (or even). In still another embodiment, the EDC generators 6,7, 8 may also be implemented in accordance with a scheme that uses a checksum. The EDC generators may then determine an arithmetic sum of code words of a certain word length, for example byte values, and their carry value. The sum may then be negated, and stored as the predetermined error detection code. The CPV stage 2 may then be configured to calculate a new checksum on the received code during program execution which is extended with the checksum. If the new checksum is not 0, an error is detected. The EDC generators 6, 7, 8 for the checksum schemes may include parity bits, check digits, and longitudinal redundancy check. In still another embodiment, the EDC generators 6, 7, 8 may be implemented in accordance with a cyclic redundancy check. In a cyclic redundancy check, a block of data is considered as the coefficients to a polynomial which is then divided by a fixed, predetermined polynomial. The coefficients of the result of the division are taken as the redundant data bits, the cyclic redundancy code (CRC). The CRC may then be stored. During program execution, the CPV stage (or rather the EDC generators 6, 7, 8 in the CPV stage 2) may re-compute the CRC from the received code bits (these code bits from the microprocessor may also be referred to as the payload) and compare the stored CRC with the new CRC. A mismatch indicates that an error occurred. Other embodiments may use a Hamming distance based check. For Hamming distance checks, an EDC generator may be implemented so as to map every n bit word of the code into a bigger n+d+1 bit word so that the minimum Hamming distance between each valid mapping is d+1. Still other embodiments may use hash functions, horizontal and vertical redundancy check, other types of redundancy check including horizontal redundancy check, vertical redundancy check and double, dual or diagonal parity (used in RAID-DP).

The continuous sequence of code received through line 14 is not limited to program code but may also or exclusively use data, address code and/or deterministic state information.

There is a control stage 5, which is coupled to the microcontroller CPU3 and receives control and configuration signals from microprocessor 3 through line 13. The control stage is configured to issue enable signals 19, 20 and 21 to EDC generators 6, 7 and 8 in order to enable or disable each of the EDC generators. There are also N comparators 9, 10, 11 for comparing the error detection codes output by the EDC generators 6, 7, 8 with predetermined values received through lines 15. There may be a memory MEM 4 for storing the predetermined error detection codes, which are to be compared with the actual error detection codes output through lines 16, 17, and 18 from EDC generators 6, 7 and 8 respectively. The memory MEM 4 may be configured to receive address information and data from the CPU 3. The memory MEM 4 may then provide the required predetermined error detection codes to line 15 in response to control data from the CPU 3. Control stage 5 is also configured to enable or disable comparators 9, 10 and 11 through individual enable lines 22, 23 and 24. The comparators 9, 10, 11 provide comparison results to exception generator 12. If the comparison of an actual EDC generator output signal EDCACCU1, EDCACCU2 or EDCACCUN indicates that the current value of the respective EDC generator 6, 7, 8 does not match with the predetermined value, the exception generator 12 is triggered to issue an exception signal through output 25. This signal may then be used to trigger an exception procedure.

The control logic 5 can be configured by the system, microcontroller or CPU 3 to setup the desired mode of operation. This may for example include the number of enabled EDC generators 6, 7, 8, the points of time at which and the parts of the system or microprocessor 3 from which data is to be fed to the EDC generators. The data on line 14 can be anything from address- and/or data-bus, CPU microcode to other deterministic state information from the system.

The control logic also monitors when a check point is reached and enables the corresponding comparators 9, 10, 11 for all enabled EDC generators which in turn trigger the exception generator 12 in case of a mismatch between the EDC generator output value and the given check value. All lines 13, 14, 15, 16, 17, 18, 19, 20, 21, 22, 23, 24, 33 and 34 may be busses having any suitable bus width.

Figure 2:
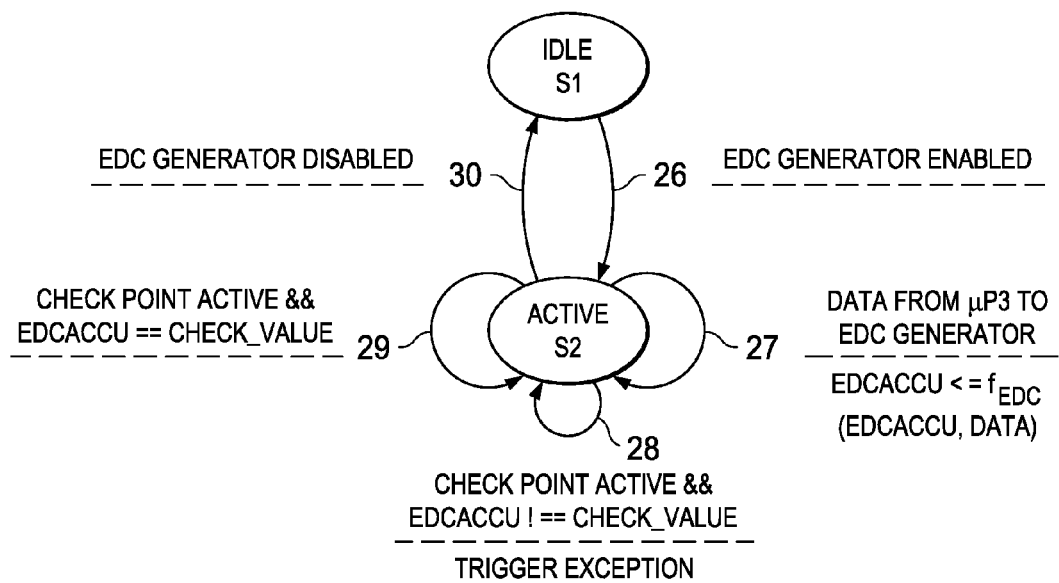
FIG. 2 shows a state diagram in Mealy format of the control logic for one EDC generator according to aspects of the invention.

FIG. 2 shows a state diagram of a possible operation of an EDC generator. Each of the EDC generators shown in FIG. 1 may be configured in accordance with this state diagram. The EDC may generally be in an idle state S1. In response to a signal from the control stage 5, which may have received a corresponding signal from the microprocessor 3, the EDC may leave the idle state S1 through path 26. The EDC generator may transition to an active state S2. The active state has three basic loops or transitions 27, 28 and 29 from which it always returns to the active state S2. The first loop 27 relates to the event that new data from the microprocessor 3 (or the system or a CPU) is received by the EDC generator. This data is then processed in the EDC generator. This means that the new value EDCACCU in the EDC generator can be determined as a function of the previous value in the EDC and the new data from the microprocessor 3. The second loop 28 is entered when a checkpoint is reached during program execution in the microprocessor. If a checkpoint is reached, the microprocessor 3 may issue a control signal to control stage 5 so as to trigger a comparison of actual error detection values in the EDC generators and stored predetermined values. Loop 28 relates to a situation where the comparison result is negative. This means that an exception is triggered. The exception generator 12 may then trigger an exception procedure or issue interrupt in order to handle the exception. Loop 29 relates to a situation where the comparison result is positive. The program has reached a checkpoint and the content EDCACCU of the EDC generator is found to match the expected value. The program can then continue execution of the program without a change. If the control stage 5 issues a corresponding signal, the EDC generator is disabled as indicated with transition path 30 and the EDC generator returns into an idle state.

As a program execution flow is often unavoidably dependent on the data being processed (for example how often a loop is executed) the expected value of the error detection code EDCACCU is not fixed but depends on various unpredictable factors. According to an aspect of the invention, most of the possible scenarios may be broken down to only two main situations. A program path splits in two or more paths (jump instruction taken or not) or a program path converges from two or more paths into one (two different jump instructions jump to the same code).

Figure 3:
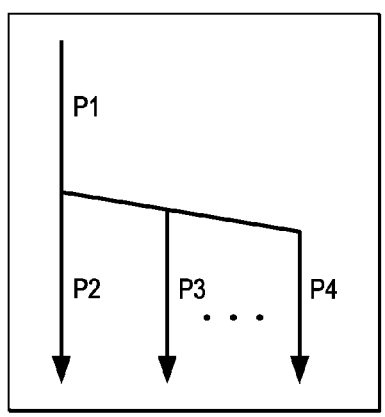
FIG. 3 is a diagram for illustrating a possible program flow relating to aspects of the invention.

FIG. 3 relates to the second scenario where a path P1 is split into multiple paths P2, P3, and P4. A corresponding code may be the following:

An illustrative extract of a source code of a procedure EXAMPLE1 may have the following structure and commands.

```
EXAMPLE1:   mov &MEM1, REG4
            cmp #CNST, REG4
            jne ERROR
            mov #OK, &MEM2
            ...
ERROR:      mov #ERR, &MEM2
```

When the program enters procedure EXAMPLE1, the memory content of a storage location indicated with pointer &MEM1 is moved to a register REG4. The content of register REG4 is then compared with a constant value CNST. If the two values are different, a jump (command jne) to procedure ERROR is performed and a constant ERR is moved to a location in the memory MEM2. If the value of CNST and the contents in register REG4 are equal, the constant OK is moved to the memory location indicated with pointer &MEM2 and procedure ERROR is not reached.

In this example, the following steps may be introduced in order to achieve code verification in accordance with aspects of the invention:

```
EXAMPLE1:   'Enable CPV' / 'Enable EDC'
            mov &MEM1, Reg4
            cmp #cnst, Reg4
            jne Error
            mov #ok, &MEM2
            ...
            'Check CPV with VAL1' / 'Check EDC with VAL1'
ERROR:      mov #err, &MEM2
            ...
            'Check CPV with VAL2' / 'Check EDC with VAL2'
```

'Enable CPV' means that a CPV stage is enabled or activated in order to process a received sequence of code. This means in particular that at least one EDC generator in the CPV stage is activated. It is therefore alternatively noted 'Enable EDC'. 'Disable CPV' or 'Disable EDC' means that the respective CPV stage (or EDC generator) is disabled. 'Check CPV with VAL1' indicates a checkpoint and means that the CPV stage or EDC stage performs a comparison of the actual determined or calculated error detection code with the indicated predetermined value VAL1. For the above embodiment, the CPV stage (EDC generator in the CPV stage) may be enabled when the procedure EXAMPLE1 is entered as indicated with 'Enable CPV'. The remaining commands are similar to the program code without a CPV stage. However, at the end of either procedure EXAMPLE1 or procedure ERROR, a check is performed with either the predetermined value VAL1 or with the predetermined value VAL2. The value VAL1, or VAL2 used for the comparison depends on the path through which the check point is reached. This means that the aspects of the invention may easily be applied to the above scenario as the two different paths check for two different expected values VAL1, VAL2 at their corresponding check points.

Figure 4:
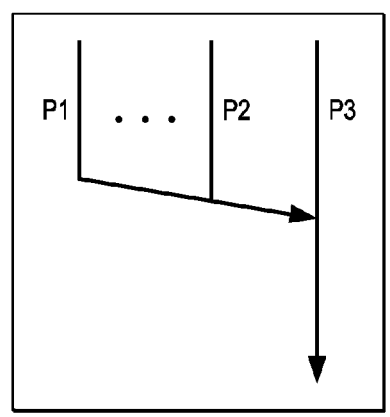
FIG. 4 is a diagram for illustrating a possible program flow relating to aspects of the invention.

FIG. 4 shows a diagram of a possible program flow in which the path converges. The program may have several individual paths P1, P2 and P3 which are used according to internal and/or external instructions or events.

```
CASE1:      mov #CNST1, REG4
            jmp CONTINUE
            ...
CASE2:      mov #CNST2, REG4
            jmp CONTINUE
            ...
CONTINUE:   mov REG4, &MEM
            ...
```

In this scenario, either procedure CASE1 or procedure CASE2 is entered. Dependent on the path (CASE1 or CASE2), either the constant CNST1 or the constant CNST2 is moved (command: mov) into register REG4. Each procedure CASE1 or CASE2 is left with an unconditional jump (command jmp) to procedure CONTINUE which moves the respective register content of register REG4 to the same memory location MEM (pointer &MEM points to the memory location and indicates the address). The following modification may then be made in order to apply the invention to the above scenario:

| | |
|---|---|
| CASE1: | 'Enable CPV1' / 'Enable EDC1'<br>'Disable CPV2' / 'Disable EDC2'<br>mov #CNST1, REG4<br>jmp CONTINUE<br>. . . |
| CASE2: | 'Enable CPV2' / 'Enable EDC2'<br>'Disable CPV1' / 'Disable EDC1'<br>mov #CNST2, REG4<br>jmp CONTINUE<br>. . . |
| CONTINUE: | mov REG4, &MEM<br>'Check CPV1 with VAL1' / 'Check EDC1 with VAL1'<br>'Check CPV2 with VAL2' /'Check EDC2 with VAL2' |

In procedure CASE1, the second CPV stage CPV2 or the second EDC EDC2 is disabled and the first CPV stage CPV1 or the first EDC EDC1 is enabled. In procedure CASE2, CPV1/EDC1 is disabled and CPV2/EDC2 is enabled. This means that only one CPV or EDC stage is active in each procedure. The respective values VAL1 and VAL2 belong to the respective CPV or EDC stage and therefore to the respective procedure. The same checkpoint is reached through two (or more) different paths in procedure CONTINUE. However by utilizing multiple CPV stages and/or EDC stages (for example N CPV or EDC stages) the same number of different paths to the same code can be protected by only enabling one of the CPV stages or EDCs when the different paths converge while all the other CPVs or EDCs are disabled. The disabled CPV or EDC stages ignore their respective checkpoints.

Figure 5:
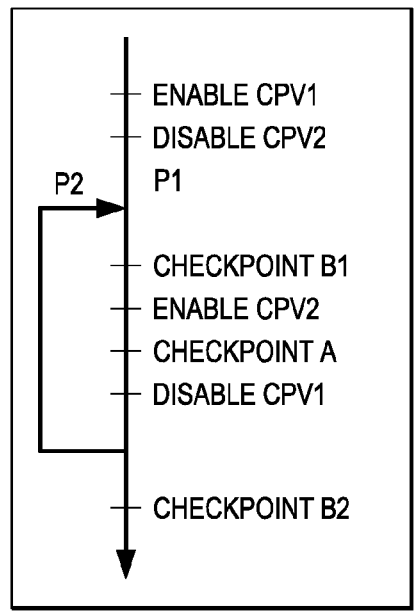
FIG. 5 is another diagram for illustrating an aspect of the invention.

FIG. 5 relates to a program flow with a loop. This example illustrates that it is possible to handle any loop with two CPV or EDC stages regardless of the number of times the program remains in the loop. Using at least two CPV stages or EDCs allows a seamless hand-over without causing any gap in code verification.

There are two paths P1, P2. Paths P1 is the initial path and path P2 relates to the loop. The entry point LOOP into the loop is reached on both paths P1, P2. Either through an initial entry into the loop through LOOPSTART (path P1) or through a conditional jump (jnz) as long as REG4 is not zero (path P2). REG4 is loaded with a value COUNT and decreased by one each time the loop is executed. This means that the loop is repeated REG4 times. The entry path is protected by using the first CPV stage CPV1 (or a first EDC), which is enabled before entering the loop. The first checkpoint B1 in the loop is dedicated to the second CPV stage (or a second EDC) CPV2, which uses predetermined value VAL1. Checkpoint B1 is ignored because CPV module CPV2 is disabled when entering the loop for the first time. Following the first checkpoint B1, the second CPV stage (or second EDC) CPV2 is enabled and reset. A checkpoint A for the first CPV stage CPV1 (or EDC) follows using value VAL2 which now verifies the entry into the loop including the correct activation of the second CPV stage CPV2. The first CPV stage CPV1 is then disabled and the main code of the loop is executed.

| | |
|---|---|
| LOOPSTART: | 'Enable CPV1' / 'Enable EDC1'<br>'Disable CPV2' / 'Disable EDC2'<br>mov #COUNT, REG4<br>. . . |
| LOOP: | 'Check CPV2 /EDC2 with VAL1' ; Checkpoint B1<br>'Enable and init CPV2' / 'Enable and init EDC2'<br>'Check CPV1 /EDC1 with VAL2' ; Checkpoint A<br>'Disable CPV1' / 'Disable EDC1'<br>. . .<br>dec REG4<br>jnz LOOP |
| LOOPEND: | . . .<br>'Check CPV2 /EDC2 with VAL3' ; Checkpoint B2 |

At the end of the loop a decision is to be made as to whether to execute the loop again or to exit the loop. If the loop is repeated, program execution continues at the start of the loop where Checkpoint B1 verifies that the loop is executed correctly (CPV2 or an EDC2 is enabled). Checkpoint A is ignored as CPV1 or EDC1 is now disabled. When the loop is left, checkpoint B2 is reached and the second CPV or EDC stage CPV2/EDC2 verifies with VAL3, whether the execution of the last round and the exit from the loop were correctly performed. The operations to enable, disable and reset the CPV modules or EDCs can be combined into a single operation to reduce code overhead. If an EDC generator detects a mismatch at a checkpoint, the microprocessor/CPU may be interrupted, using for example a non-maskable interrupt.

Figure 6:
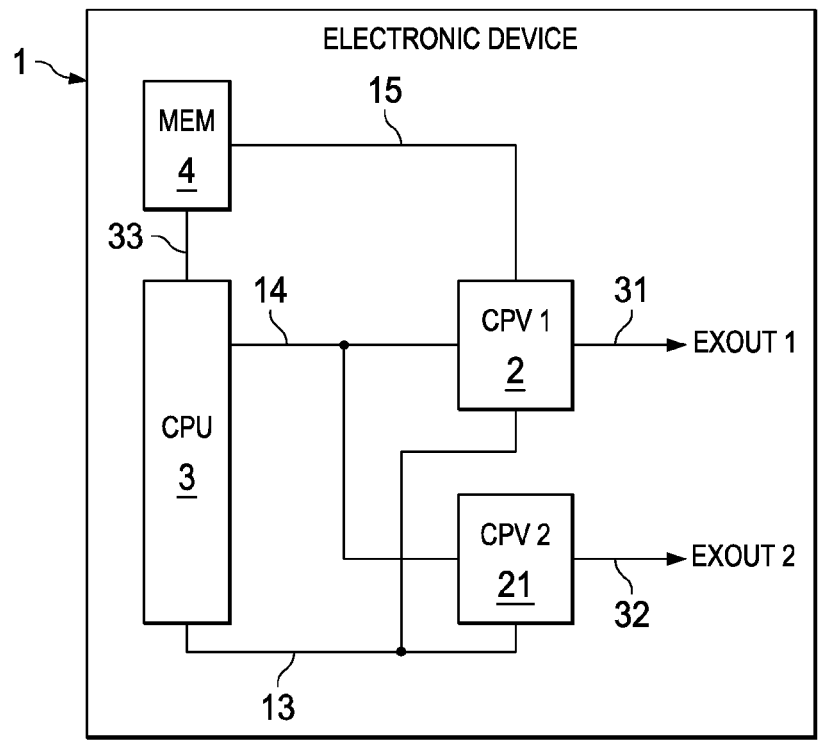
FIG. 6 is a simplified block diagram of an embodiment of the invention using multiple CPV stages.

FIG. 6 shows a simplified block diagram of an embodiment of the invention. There is an electronic device 1 including a microprocessor CPU 3, a memory MEM 4 and at least two CPV stages CPV1 2 and CPV2 21. The basic configuration is similar to the embodiment shown in FIG. 1. Line 14 serves to provide code to the CPV stages 2 and 21. Each of the CPV stages 2 and 21 may include one or more EDC generators in accordance with the aspects and embodiments of the invention. Line 13 conveys control and configuration signals to the CPV stages 2, 21 and line 15 is used for transmitting predetermined error detection codes to the CPV stages 2, 21. The CPV stages provide output signals EXOUT1 and EXOUT2 on lines 31, 32 indicating detected errors during program execution. The CPV stages 2, 21 may be implemented as shown in FIG. 1 for CVP stage 2. Furthermore, the two CPV stages may be configured and used as explained with respect to FIG. 5 in order to handle loops in a program flow. All lines may be busses of any suitable bus width.

Although the present invention has been described in detail, it should be understood that various changes, substitutions and alterations can be made thereto with-out departing from the spirit and scope of the invention as defined by the appended claims.

The invention claimed is:

1. An electronic device comprising:
   a microprocessor for executing a program code;
   a first hardware code path verifying (CPV) stage coupled to the microprocessor; and
   wherein the hardware CPV stage comprises a first error detection code (EDC) generator configured to receive a signal from a control stage to enter an active state from an idle state and then to continuously determine an error detection code on a first branch of a continuous sequence of program code while the program code is being executed in the microprocessor and to compare the determined error detection code with a predetermined error code so as to verify correct execution of the program code or to indicate an error, and a second EDC generator configured to continuously determine an error detection code on a second branch of a continuous sequence of program code while the program code is being executed in the microprocessor and compare the determined error detection code with a predetermined error code so as to verify correct execution of the program code or to indicate an error, the first and the second EDC generators being configured to be independently enabled or disabled for determining error detection codes of the first and second paths of the program code.

2. The electronic device according to claim 1, wherein the first hardware CPV stage is coupled to one of a data bus, an address bus, or a command bus of the microprocessor for monitoring the continuous sequence of code.

3. The electronic device according to claim 1, wherein the first hardware CPV stage is configured to compare the actual error detection code with the predetermined error code at a predetermined check point of the program flow.

4. The electronic device according to claim 1, comprising a second hardware CPV stage and wherein the first hardware CPV stage and the second hardware CPV stage are configured to be independently enabled or disabled.

5. The electronic device according to claim 4, being further configured to enable or disable the EDC generators or hardware CPV stages based on address information.

6. The electronic device according to claim 5, being configured to enable or disable the first or second hardware CPV stage at the beginning or the end of a loop of the program.

7. The electronic device according to claim 6, being configured to enable and disable the first or second hardware CPV stage at the beginning and the end of a loop of the program.

8. The electronic device according to claim 4, being further configured to enable and disable the EDC generators and hardware CPV stages based on address information.

9. The electronic device according to claim 1 wherein the continuous sequence of code may use or include data, address code or deterministic state information.

10. The electronic device according to claim 1 wherein the EDC generator is hardware-based.

11. A method of verifying correct program execution of a microprocessor with a first and second hardware code path verifying (CPV) stage coupled to the microprocessor, the method comprising:
- executing a program code on the microprocessor;
- receiving a signal from a control stage to cause the CPV stages to enter an active state form an idle state;
- continuously determining with the first hardware CPV stage an error detection code on a continuous sequence of the program code while the program code is being executed in one path of the program code;
- continuously determining with the second hardware CPV stage an error detection code on a continuous sequence of the program code while the program code is being executed in a second path of the program code; and
- comparing the error detection code with a predetermined error code so as to verify correct execution of the program code or to indicate an error.

12. The method according to claim 11, wherein the comparing of the actual error detection code with the predetermined error code is at a predetermined check point of the program flow.

13. The method according to claim 11 wherein the continuous sequence of code may use or include data, address code or deterministic state information.

14. The method according to claim 11 wherein the CPV comprises an EDC generators which is hardware-based.

15. In a microprocessor system, a device for verifying program execution comprising:
- a first hardware code path verifying (CPV) coupled to the microprocessor; and
- wherein the hardware CPV stage comprises a first error detection code (EDC) generator configured to receive a signal from a control stage to enter an active state from an idle state and then to determine an error detection code on a first branch of a continuous sequence of program code being executed in the microprocessor and to compare the determined error detection code with a predetermined error code so as to verify correct execution of the program code or to indicate an error, and a second EDC generator configured to determine an error detection code on a second branch of ac continuous sequence of program code being executed in the microprocessor and compare the determined error detection code with a predetermined error code so as to verify correct execution of the program code or to indicate an error, the first and the second EDC generators being configured to be independently enabled or disabled for determining error detection codes of the first and second paths of the program code.

16. The system according to claim 15, wherein the first CPV circuit is coupled to one of a data bus, an address bus, or a command bus of the microprocessor for monitoring the continuous sequence of code.

17. The system according to claim 15, wherein the first CPV stage is configured to compare the actual error detection code with the predetermined error code at a predetermined check point of the program flow.

18. The system according to claim 15, wherein the first CPV circuit comprises a second EDC generator and the first and the second EDC generators are configured to be independently enabled or disabled for determining error detection codes of different paths of the program code.

19. The system according to claim 15, comprising a second CPV circuit and wherein the first circuit and the second CPV circuits are configured to be independently enabled or disabled.

* * * * *